(12) United States Patent
Fuchs et al.

(10) Patent No.: US 12,369,530 B2
(45) Date of Patent: Jul. 29, 2025

(54) AGRICULTURAL BALER WITH TENSIONING DEVICE FOR A TRACTION DRIVE

(71) Applicant: Usines CLAAS France S.A.S, St. Rémy/Woippy (FR)

(72) Inventors: Volker Fuchs, Saarburg (DE); Emile Gaucher, Chevillon (FR); Daniel Mörsch, Perl (DE); Thierry Walter, Longeville-lès-Metz (FR)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 53 days.

(21) Appl. No.: 18/224,350

(22) Filed: Jul. 20, 2023

(65) Prior Publication Data

US 2024/0306552 A1     Sep. 19, 2024

(30) Foreign Application Priority Data

Mar. 15, 2023   (EP) .................................... 23161951

(51) Int. Cl.
*A01F 15/08*     (2006.01)
*A01F 15/18*     (2006.01)

(52) U.S. Cl.
CPC ............ *A01F 15/085* (2013.01); *A01F 15/18* (2013.01)

(58) Field of Classification Search
CPC ................ F16H 2007/0812; F16H 7/10; F16H 2007/0876; A01F 15/0825; A01F 15/0841; A01F 15/07
USPC ....................................................... 474/110
See application file for complete search history.

(56) References Cited

U.S. PATENT DOCUMENTS

| 2,656,565 | A | * | 10/1953 | Apel | ................... | B29C 35/0277 |
| | | | | | | 474/110 |
| 2,834,177 | A | * | 5/1958 | Russell | ............... | A01F 15/0841 |
| | | | | | | 56/11.1 |
| 3,006,207 | A | * | 10/1961 | Russell | ............... | A01F 15/0841 |
| | | | | | | 474/46 |

(Continued)

FOREIGN PATENT DOCUMENTS

EP          0126808 B1      8/1988

OTHER PUBLICATIONS

European Search Report for EP Application No. 23161951.1-1105 mailed Jun. 5, 2023.

*Primary Examiner* — Henry Y Liu
(74) *Attorney, Agent, or Firm* — Lempia Summerfield Katz LLC

(57)  ABSTRACT

An agricultural baler with at least one traction drive for driving working units of the agricultural baler is disclosed. At least one tensioning device is assigned to the traction drive with the at least one tensioning device comprising a tensioning member for adjusting a tensioning force exerted using the tensioning device on a traction means of the at least one traction drive. The agricultural baler may be characterized in that the tensioning member comprises a piston/cylinder unit, with a piston of the piston/cylinder unit being connected directly or indirectly via an additional lever to a tensioning means of the tensioning device, via which the tensioning force is applied to the traction means of the at least one traction drive. A lubricant, such as a lubricating grease, may be supplied to the piston/cylinder unit for adjusting the tensioning force exerted on the traction means.

19 Claims, 5 Drawing Sheets

(56) References Cited

U.S. PATENT DOCUMENTS

| | | | | |
|---|---|---|---|---|
| 3,626,776 | A * | 12/1971 | Staudinger et al. | F16H 7/0848 474/111 |
| 3,914,926 | A * | 10/1975 | Braunberger | A01F 15/07 100/88 |
| 3,964,246 | A * | 6/1976 | Kopaska | A01F 15/0883 100/88 |
| 4,094,205 | A * | 6/1978 | Cook | F16H 7/10 74/731.1 |
| 4,257,219 | A * | 3/1981 | Burrough | A01F 15/0833 100/88 |
| 4,277,240 | A * | 7/1981 | Kraft | F02B 67/06 474/110 |
| 4,283,181 | A * | 8/1981 | Sproul | F16H 7/1236 474/110 |
| 4,283,182 | A * | 8/1981 | Kraft | F16H 7/1236 474/110 |
| 4,299,583 | A * | 11/1981 | Kraft | F16H 7/129 474/110 |
| 4,344,598 | A * | 8/1982 | Sloyan | F16M 7/00 248/657 |
| 4,674,996 | A * | 6/1987 | Anno | F16H 7/129 474/133 |
| 4,761,155 | A * | 8/1988 | Kinoshita | F02B 67/06 474/133 |
| 4,840,437 | A * | 6/1989 | Henry | B62D 55/305 305/144 |
| 5,063,961 | A * | 11/1991 | Brunner | F16J 15/104 251/363 |
| 5,254,047 | A * | 10/1993 | Anderson | B62D 55/30 474/136 |
| 5,286,233 | A * | 2/1994 | Engelstad | F16H 7/1281 474/101 |
| 5,358,452 | A * | 10/1994 | Zhao | F16H 7/1281 474/133 |
| 5,367,865 | A * | 11/1994 | Jennings | A01F 15/0833 100/88 |
| 5,622,104 | A * | 4/1997 | Viesselmann | A01F 15/07 100/88 |
| 6,004,112 | A * | 12/1999 | Cook | F04C 29/005 417/362 |
| 6,234,929 | B1 * | 5/2001 | Rasche | F16H 7/0848 474/138 |
| 6,305,762 | B1 * | 10/2001 | Oertley | B62D 55/30 305/145 |
| 6,332,309 | B1 * | 12/2001 | Rodewald | A01F 15/07 100/88 |
| 6,354,678 | B1 * | 3/2002 | Oertley | B62D 55/30 305/144 |
| 6,478,701 | B1 * | 11/2002 | Yasuhara | F16H 7/12 474/135 |
| 6,505,549 | B2 * | 1/2003 | Brox | D21F 7/04 100/153 |
| 6,745,681 | B2 * | 6/2004 | Lucand | A01F 15/07 100/88 |
| 6,899,650 | B2 * | 5/2005 | Okuda | F16H 7/129 474/110 |
| 7,070,528 | B2 * | 7/2006 | Emizu | F16H 7/0836 474/110 |
| 7,108,621 | B2 * | 9/2006 | Ullein | F16H 7/0836 474/101 |
| 7,322,895 | B2 * | 1/2008 | Namuduri | F16H 7/1281 474/110 |
| 8,499,685 | B2 * | 8/2013 | Viaud | A01F 15/0833 100/88 |
| 9,198,351 | B2 * | 12/2015 | Tilly | A01D 45/021 |
| 9,528,576 | B2 * | 12/2016 | Anstey | A01F 15/0841 |
| 9,581,216 | B2 * | 2/2017 | Parizek | F16F 9/063 |
| 9,622,419 | B2 * | 4/2017 | Simmons | A01F 15/0825 |
| 9,706,717 | B2 * | 7/2017 | Chapon | A01F 15/0883 |
| 9,750,194 | B2 * | 9/2017 | Vandamme | A01F 15/0841 |
| 9,995,374 | B2 * | 6/2018 | Anstey | A01D 69/002 |
| 10,225,989 | B2 * | 3/2019 | Reijersen Van Buuren | A01F 15/0715 |
| 10,240,664 | B2 * | 3/2019 | Ryeland | F16H 7/0836 |
| 10,264,733 | B2 * | 4/2019 | Schlichting | A01F 15/07 |
| 10,383,285 | B2 * | 8/2019 | Simmons | A01F 15/0833 |
| 10,588,264 | B2 * | 3/2020 | Stivala | A01F 15/0833 |
| 10,781,896 | B2 * | 9/2020 | Zientara | F04B 17/05 |
| 10,851,718 | B2 * | 12/2020 | Nishio | F01M 1/16 |
| 10,900,544 | B2 * | 1/2021 | Kimura | F16K 15/028 |
| 10,986,785 | B2 * | 4/2021 | Denis | A01F 15/106 |
| 11,744,182 | B2 * | 9/2023 | Carlson | A01D 41/1272 56/36 |
| 11,818,985 | B2 * | 11/2023 | Schlichting | A01F 15/0715 |
| 2001/0016530 | A1 * | 8/2001 | Grunke | F16H 7/0836 474/101 |
| 2002/0022541 | A1 * | 2/2002 | Ullein | F16H 7/0836 474/101 |
| 2002/0059872 | A1 * | 5/2002 | Brox | D21F 7/04 100/327 |
| 2003/0084792 | A1 * | 5/2003 | Lucand | A01F 15/07 100/8 |
| 2003/0171179 | A1 * | 9/2003 | Okuda | F16H 7/129 474/135 |
| 2003/0216202 | A1 * | 11/2003 | Emizu | F16H 7/0836 474/110 |
| 2012/0202629 | A1 * | 8/2012 | O'Shea | F16H 7/0836 474/110 |
| 2013/0298786 | A1 * | 11/2013 | Simmons | A01F 15/0825 100/76 |
| 2013/0298787 | A1 * | 11/2013 | Simmons | A01F 15/18 100/76 |
| 2014/0095043 | A1 * | 4/2014 | Gomez | B60T 7/20 701/70 |
| 2014/0237982 | A1 * | 8/2014 | Vandamme | A01F 15/10 56/341 |
| 2014/0309882 | A1 * | 10/2014 | Antchak | F02B 67/06 474/104 |
| 2015/0211594 | A1 * | 7/2015 | Parizek | F16H 7/08 267/121 |
| 2015/0373917 | A1 * | 12/2015 | Reijersen Van Buuren | A01F 15/0715 53/529 |
| 2016/0007540 | A1 | 1/2016 | Schlichting | B30B 9/3082 56/432 |
| 2016/0305514 | A1 * | 10/2016 | Anstey | A01D 69/002 |
| 2016/0366831 | A1 * | 12/2016 | Chapon | A01F 15/07 |
| 2017/0016518 | A1 * | 1/2017 | Anstey | F16H 7/08 |
| 2017/0175858 | A1 * | 6/2017 | Ryeland | F02B 67/06 |
| 2017/0188520 | A1 * | 7/2017 | Simmons | A01F 15/0833 |
| 2017/0265399 | A1 * | 9/2017 | Stivala | A01F 15/0833 |
| 2017/0370303 | A1 * | 12/2017 | Altmann | A01D 41/127 |
| 2018/0084722 | A1 * | 3/2018 | Wieckhorst | B60W 40/064 |
| 2018/0363740 | A1 * | 12/2018 | Kimura | F16H 7/0848 |
| 2019/0387684 | A1 * | 12/2019 | Denis | A01F 15/18 |
| 2020/0132001 | A1 * | 4/2020 | Nishio | F02P 5/15 |
| 2020/0178469 | A1 * | 6/2020 | Schlichting | A01F 15/0715 |
| 2022/0000006 | A1 * | 1/2022 | Wieckhorst | A01B 59/066 |
| 2022/0386531 | A1 * | 12/2022 | Carlson | A01F 15/07 |
| 2023/0076926 | A1 * | 3/2023 | Füchtling | A01D 41/141 |
| 2023/0084503 | A1 * | 3/2023 | Scharf | A01F 15/0825 56/341 |
| 2023/0371436 | A1 * | 11/2023 | Derscheid | A01F 15/071 |

* cited by examiner

AGRICULTURAL BALER WITH TENSIONING DEVICE FOR A TRACTION DRIVE

CROSS REFERENCE TO RELATED APPLICATION

This application claims priority under 35 U.S.C. § 119 to European Patent Application No. EP23161951 filed Mar. 15, 2023, the entire disclosure of which is hereby incorporated by reference herein.

TECHNICAL FIELD

The present invention relates to an agricultural baler with at least one traction drive for driving working units of the agricultural baler and to a combination of an agricultural working machine, such as a tractor, and such an agricultural baler pulled thereby.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In agricultural balers, so-called traction drives are used to drive the individual working units or functional assemblies. The traction drives may be designed either as belt drive or chain drive and may ensure a transmission of drive power corresponding to the machine output. In order to make this continuously possible (even under difficult harvesting conditions), it may be necessary to apply the required tension to the traction means of the traction drive. This may be implemented using a tensioning device associated with the traction drive. During operation of the agricultural baler, the traction means of the traction drive may undergo successive elongation, which may be permissible to a certain extent, but which may result in the tension in the traction means of the traction drive correspondingly changing (e.g., decreasing). In order to maintain the tension of the traction means necessary for the transmission of the drive force, it may therefore be necessary to correspondingly readjust the tension force applied by the tensioning device during operation of the agricultural baler.

In this context, EP 0 126 808 B1 discloses a spring-loaded tensioning device for a V-belt drive in which a compression spring with a pre-tensioning device transmits the tensioning force via a pull rod to a pivoting double lever. A V-belt tensioning pulley is mounted at the other end of the double lever and acts on the V-belt to be tensioned so that the V-belt tension required for drive force transmission is available. The compression spring is arranged or positioned on a spring holder between thrust bearings on the tie rod and a fixed holder connected to the machine frame. The required pretension of the compression spring is set by turning the thrust bearings on the tie rod. Readjustment of the tension force to be applied during operation of the belt drive may also be realized or implemented by turning the thrust bearings.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
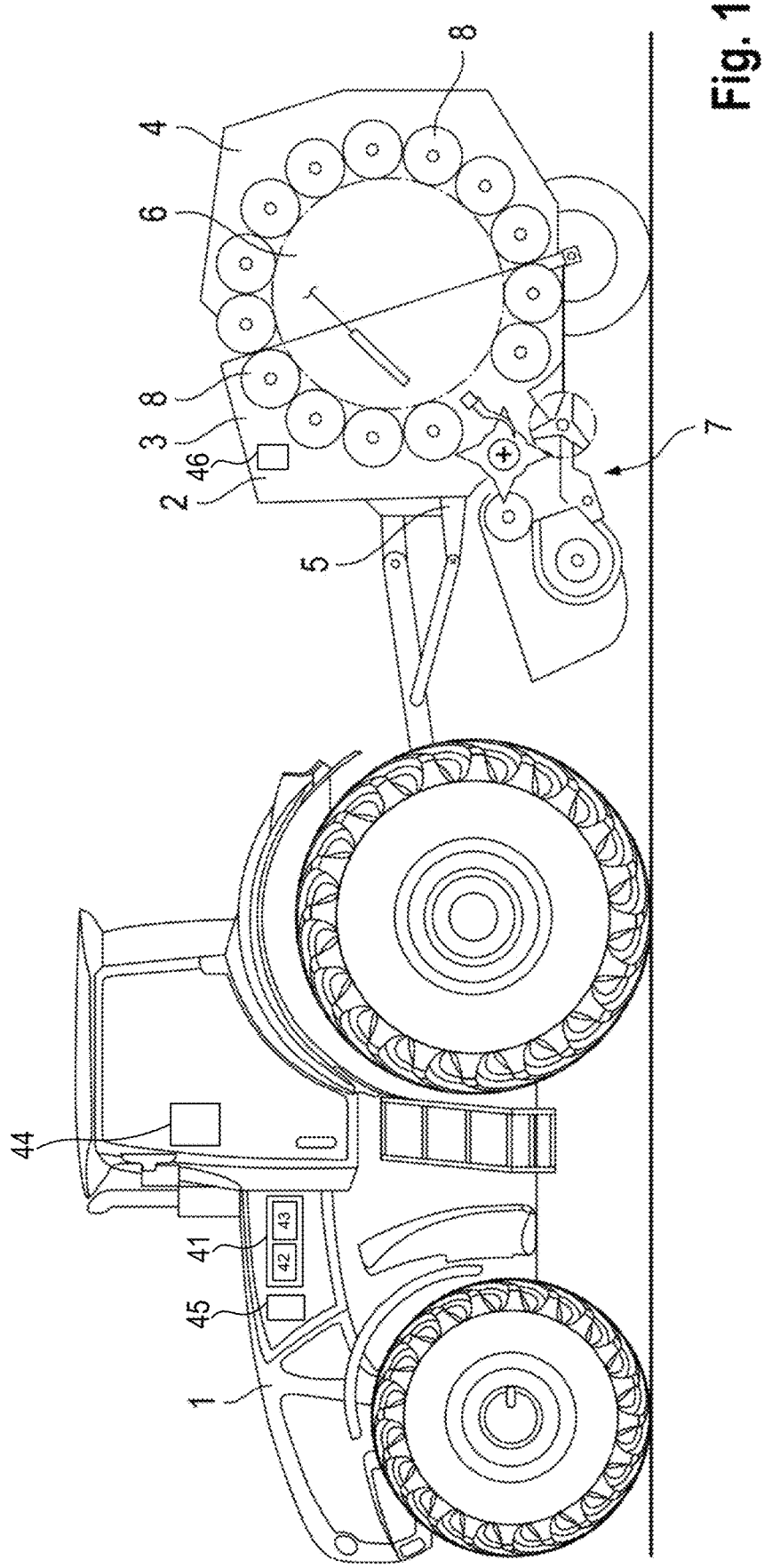
FIG. 1 illustrates a schematic and exemplary representation of a combination of an agricultural production machine designed as a tractor and an agricultural baler pulled thereby.

As discussed in the background, a V-belt tensioning pulley may be used. Due to the successive elongation of the V-belt during operation of the V-belt drive, such a tensioning device may require an operator to manually adjust the tensioning force applied via the tensioning device at regular intervals by turning the thrust bearings. Such an operation is associated with a continuous expenditure of time for the operator and may require the application of high forces to adjust the tensioning force, which may be perceived by the operator as physically very stressful. Furthermore, the use of such a tensioning device may be associated with high manufacturing costs, since a large number of individual parts are required, the manufacture and assembly of which in turn may result in high manufacturing costs.

Thus, in one or some embodiments, an agricultural baler is disclosed with at least one traction drive in which the adjustment of a tensioning force applied to the traction means of the at least one traction drive via a tensioning device is simplified, thereby reducing the required time and force.

Accordingly, in one or some embodiments, the agricultural baler is disclosed as having at least one traction drive configured to drive one or more working units of the agricultural baler. At least one tensioning device may be associated with the traction drive, wherein the at least one tensioning device comprises at least one tensioning member for adjusting a tensioning force exerted the tensioning device on a traction means of the at least one traction drive. In one or some embodiments, the at least one tensioning member comprises a piston/cylinder unit, wherein a piston of the piston/cylinder unit is connected (directly or indirectly) via an additional lever to a tensioning means of the tensioning device, via which the tensioning force is applied to the traction means of the at least one traction drive. Further, a lubricant, such as a lubricating grease, may be supplied to the piston/cylinder unit for adjusting the tensioning force exerted on the traction means.

In one or some embodiments, by charging the piston/cylinder unit with a lubricant from a lubricant supply, it is possible to apply the tensioning force required or appropriate for proper operation of the traction drive by the tensioning device in a particularly uncomplicated manner. A quantity of lubricant at a certain pressure may be supplied to a cylinder space formed by an inner wall of the cylinder and an end face of the piston, which may displace the piston in the cylinder in such a way that a tensioning force is transmitted to the traction means of the traction drive via the tensioning means of the tensioning device. In one or some embodiments, this tensioning force may ensure that the traction means of the traction drive is in the sufficiently tensioned state (such as always in a sufficiently tensioned state) so that a transmission of drive force from a drive of the traction drive via the traction means to an output of the traction drive takes place (such as always takes place) reliably and to the desired extent.

In one or some embodiments, it may no longer be necessary for an operator to laboriously adjust any thrust bearings or nuts by manual actuation in order to thereby set or reset the tensioning force of a tensioning device. Further, the use of a tensioning member comprising a piston/cylinder unit may also ensure that the effort to manufacture the tensioning device and the costs of manufacturing and assembling a large number of individual components are reduced.

In one or some embodiments, the piston/cylinder unit comprises a lubricant inlet for supplying the lubricant, wherein the lubricant inlet comprises a check valve. This may ensure that after the tensioning force applied to the traction means by the tensioning device has been adjusted by supplying the lubricant, the lubricant does not escape from the cylinder chamber of the piston/cylinder unit in an undesirable manner via the lubricant inlet, which may cause an adjusted tensioning force to not be maintained by the tensioning device, which in turn may lead to an insufficient tension state of the traction means of the traction drive. In one or some embodiments, as soon as the process of feeding the lubricant into the piston/cylinder unit is completed, the check valve may close the lubricant inlet valve of the piston/cylinder unit so that the set tensioning force may be maintained.

In one or some embodiments, the check valve of the lubricant inlet is designed as a controllable check valve. The use of a controllable check valve may allow the pressure required to actuate the check valve to be set variably. Furthermore, it is possible to move the check valve from the closed position to the open position by controlling contrary to the normal mode of operation of the check valve in order, for example, to be able to remove lubricant present in the cylinder chamber of the piston/cylinder unit in a particularly uncomplicated manner during a removal or maintenance process.

In one or some embodiments, the agricultural baler comprises a central lubrication system fluidically connected to the lubricant inlet of the piston/cylinder unit for supplying the lubricant. The fluidic connection of a central lubrication system on the baler with the lubricant inlet of the piston/cylinder unit may allow automatic adjustment of the tensioning force of the tensioning device. In one or some embodiments, as soon as the agricultural baler is put into operation, the central lubrication system may continuously feed lubricant at a certain pressure into the cylinder chamber of the piston/cylinder unit, causing the piston to move in the cylinder. The movement of the piston further may cause the tensioning means connected to the piston to also undergo a shift which may cause the tensioning force to be transmitted to the traction means via a contact surface between the tensioning means and the traction means of the traction drive. The operator may therefore be freed from adjusting or readjusting the tensioning force of the tensioning device.

In particular, in one or some embodiments, the central lubrication system may comprise any one, any combination, or all of at least one lubricant container, a lubricant pump and a lubricant distribution unit. The lubricant pump may be fluidically connected both to the lubricant container and to the lubricant distribution unit. The lubricant distribution unit may comprise a lubricant inlet which may be fluidically connected to the lubricant pump by means of a lubricant main line, and at least two lubricant outlets. One lubricant outlet of the at least two lubricant outlets may be fluidically connected to the lubricant inlet of the piston/cylinder unit via a lubricant distribution line.

This design may make it possible to very easily couple a central lubrication system in the agricultural baler to the tensioning device in order to generate the tensioning force applied by this tensioning device. In particular, no complicated and involved conversion measures need be performed on the agricultural baler. Instead, a lubricant distribution line originating from the lubricant distribution unit of the central lubrication system may be coupled to the lubricant inlet of the piston/cylinder unit of the tensioning device which ensures that the lubricant is supplied to the piston/cylinder unit of the tensioning device from a lubricant reservoir of the central lubrication system.

In one or some embodiments, the lubricant distribution line connecting the lubricant outlet of the lubricant distribution unit to the lubricant inlet of the piston/cylinder unit comprises a branch line which branches off from the lubricant distribution line, such as directly upstream from the lubricant inlet of the piston/cylinder unit. The branch line may be fluidically connected to at least one lubrication point on the tensioning device, such as a bearing point of the tensioning means and/or at least one bearing point of the additional lever.

The lubricant already present in the lubricant distribution line, which may be supplied to the piston/cylinder unit of the tensioning device for adjusting the tensioning force of the tensioning device, may still be used to lubricate the lubrication points on the tensioning device by creating a branch line branching off from this lubricant distribution line.

In one or some embodiments, the branch line may include a check valve or a pressure relief valve.

As soon as the necessary tensioning force has been generated by feeding lubricant into the cylinder chamber, an excess unrequired quantity of lubricant, which may be continuously supplied by the central lubrication system via the lubricant distribution line, may be used to supply the previously mentioned lubrication points with lubricant. For this purpose, a check valve or pressure relief valve may be provided in the branch line, which may be released as soon as the required tensioning force of the tensioning device is reached (e.g., an additional supply of lubricant into the cylinder chamber of the piston/cylinder unit is no longer necessary).

In particular, the branch line check valve may be designed as a controllable check valve, or the branch line pressure relief valve may be designed as an adjustable pressure relief valve.

In one or some embodiments, the use of a controllable check valve or adjustable pressure relief valve may allow the pressure required to actuate the check valve or pressure relief valve to be variably adjusted depending on the tensioning force to be applied.

In one or some embodiments, at least one additional lubricant outlet of the at least two lubricant outlets of the lubricant distribution unit is fluidically connected to a lubrication point of the agricultural baler by means of another lubricant distribution line.

The central lubrication system may therefore continue to be used for supplying lubrication points of the agricultural baler, as is typically provided. In this context, it is possible for one or more of the additional lubricant distribution lines leading from the lubricant distribution unit to be fluidically connected to another lubricant distribution unit, wherein additional lubricant distribution lines in turn may lead from the additional lubricant distribution unit to various lubrication points of the agricultural baler.

In one or some embodiments, the lubricant inlet of the piston/cylinder unit for supplying the lubricant is designed as a grease nipple, wherein the lubricant may be supplied to the piston/cylinder unit via the grease nipple using a grease gun.

If there is no central lubrication system in the agricultural baler, the tensioning force may still be adjusted by feeding lubricant into the cylinder chamber of the piston/cylinder unit. An operator of the agricultural baler may guide the lubricant present in the grease gun into the cylinder chamber of the piston/cylinder unit using a grease gun, which may be attached to the grease nipple of the piston/cylinder unit, in order to thereby adjust the required tensioning force applied to the traction means by the tensioning device.

In one or some embodiments, the piston/cylinder unit comprises a lubricant outlet for discharging at least a portion of the lubricant from the piston/cylinder unit, wherein the lubricant outlet comprises a check valve or a pressure relief valve.

As soon as the necessary tensioning force is set by supplying lubricant, excess lubricant may escape from the cylinder chamber. Using the check valve or pressure relief valve that is provided in the lubricant outlet of the piston/cylinder unit, a pressure level may be defined above which the lubricant exits the piston/cylinder unit, which signals to the operator that the necessary tensioning force has been set.

Even though this design of the piston/cylinder unit may be advantageous when using a grease gun to supply lubricant to the piston/cylinder unit, it is equally contemplated for such a lubricant outlet valve to be used when supplying lubricant to the piston/cylinder unit via a central lubrication system of the agricultural baler.

In one or some embodiments, the check valve of the lubricant outlet is designed as a controllable check valve, or the pressure relief valve of the lubricant outlet is designed as an adjustable pressure relief valve.

In this case as well, the use of a controllable check valve or adjustable pressure relief valve may allow the pressure required to actuate the check valve or pressure relief valve to be variably adjusted depending on the tensioning force to be applied.

In particular, the lubrication outlet of the piston/cylinder unit may be fluidically connected to at least one lubrication point on the tensioning device, such as a bearing point of the tensioning means and/or at least one bearing point of the additional lever.

Insofar as the excess lubricant which exits from the lubricant outlet valve of the piston/cylinder unit is not supposed to be lost without being used, it may advantageously be used to lubricate these lubrication points via a fluidic connection of the lubricant outlet of the piston/cylinder unit to at least one lubrication point of the tensioning device.

In one or some embodiments, the agricultural baler comprises a control device which is configured to selectively control the valve in the lubricant inlet of the piston/cylinder unit, the valve in the lubricant outlet of the piston/cylinder unit, the valve in the branch line branching off from the lubricant distribution line and/or the lubricant container, the lubricant pump and/or the lubricant distribution unit of the central lubrication system corresponding to a presettable or preset specification.

The use of a control device which is configured to selectively control the valves, if any, according to a presettable or preset specification may be regarded as advantageous in that a highly precise adjustment of the tensioning force of the tensioning device is possible with a simultaneously extremely reliable supply of lubrication points of the tensioning device and/or the agricultural baler. The specifications used by the control device to control the valves and/or components of the central lubrication system may either be defined in advance by an operator or stored in a memory unit connected to the control device which the control device may then independently access.

In one or some embodiments, the tensioning member comprises a tensioning spring which is arranged or positioned between a cylinder and the piston of the piston/cylinder unit.

The use of an additional tensioning spring as part of the tension member may ensure that any loss of tension force in the traction means due to elongation effects during the life of the traction drive or during operation of the agricultural baler is retransmitted to the tensioning device, which may signal or trigger a readjustment of the tension force by supplying lubricant to the piston/cylinder unit.

In one or some embodiments, the agricultural baler comprises a plurality of traction drives, each having at least one tensioning device.

In one or some embodiments, the at least one traction drive is a belt drive, and the tensioning means of the tensioning device is a belt tensioning pulley.

In one or some embodiments, the at least one traction drive is a chain drive, and the tensioning means of the tensioning device is a chain tensioning wheel.

Depending on the design of the agricultural baler, the necessary traction drives may therefore be installed which may transmit the drive force required to drive the corresponding working unit or the functional unit of the agricultural baler. In this context, it is contemplated that all traction drives of the agricultural baler are designed as belt drives or as chain drives. However, it is just as possible that some of the traction drives of the agricultural baler are designed as belt drives and others as chain drives.

In one or some embodiments, a combination of an agricultural working machine (interchangeably termed agricultural machine), such as a tractor, and an agricultural baler pulled thereby is further disclosed.

Referring to the figures, FIG. 1 shows a schematic and exemplary representation of a combination according to one aspect of the invention of an agricultural production machine 1 and an agricultural baler 2 towed thereby. The agricultural production machine 1 may be designed as a tractor in the representation shown in FIG. 1, but other agricultural production machines 1 which are configured to tow or drag an agricultural baler 2 are equally contemplated within the scope of the present invention. Example tractors are disclosed in US Patent Application Publication No. 2022/0000006 A1, which is incorporated by reference herein in its entirety. In the representation shown in FIG. 1, the agricultural baler 2 is designed as a round baler. The round baler has a baler housing which consists of or has a fixed housing part 3 and a discharge flap 4 pivotably mounted on the fixed housing part 3. The discharge flap 4 may be pivotably mounted on the fixed housing part 3 of the baler housing in such a way that it may be displaced between a closed position and an open position. The baler housing, such as the fixed housing part 3, may be generally arranged on a chassis 5 and connected thereto, through which the round baler may in turn be coupled to the agricultural production machine 1.

The baler housing, such as the housing part 3 and discharge flap 4, may delimit a baling chamber 6 into which the harvested material is conveyed with the aid of means 7 for picking up and conveying harvested material. In one or some embodiments, the means 7 may comprise at least any one, any combination, or all of a so-called pick-up, a cutting rotor and a feed rake. As one example, US Patent Application Publication No. 2023/0076926 A1, incorporated by reference herein in its entirety, discloses a pick-up device. As another example, US Patent Application Publication No. 2023/0084503 A1, incorporated by reference herein in its entirety, discloses a cutting rotor. As still another example, U.S. Pat. No. 9,198,351 B1, incorporated by reference herein in its entirety, discloses a feed rake. A description of these means 7 will be omitted here, since they are sufficiently well known to those of skill in the art.

In one or some embodiments, both the fixed housing part 3 and the discharge flap 4 have a plurality of pressing rollers 8 which may be arranged distributed at a distance from one another on both housing parts 3 and a discharge flap 4 and may peripherally border the pressing chamber 6. Each of the pressing rollers 8 may be driven, whereby the harvested material conveyed into the pressing chamber 6 may be formed or pressed (such as into a round bale). The round baler may also have a device (not shown in figures) for wrapping round bales pressed in the pressing chamber 6 with a cover, which may be designed as a film, net or the like.

Even though the agricultural baler 2 illustrated in the figures is designed as a round baler with pressing rollers 8, the invention is equally applicable to round balers with a variable baler chamber and square balers.

In one or some embodiments, the agricultural baler 2 comprises at least one traction drive 9 for driving working units of the agricultural baler 2. Example traction drives 9 are disclosed in US Patent Application Publication No. 2014/0095043 A1; US Patent Application Publication No. 2017/0370303 A1; US Patent Application Publication No. 2018/0084722 A1, each of which are incorporated by reference herein in their entirety. In one or some embodiments, one, some or all driven functional units of the agricultural baler 2 are to be regarded as working units of the agricultural baler 2, such as for example pressing rollers 8, means 7 for picking up and conveying harvested material, a device for wrapping, a discharge flap 4 or the like.

FIG. 1 further depicts computing functionality. Various types of computing functionality are contemplated, such as control unit 41. The control unit 41 may comprise at least one processor 42 and at least one memory 43 that stores information and/or software, with the processor 42 configured to execute the software stored in the memory 43. In this regard, the control unit 41 may comprise any type of computing functionality, such as the at least one processor 42 (which may comprise a microprocessor, controller, PLA, or the like) and the at least one memory 43. The memory 43 may comprise any type of storage device (e.g., any type of memory). Though the processor 42 and the memory 43 are depicted as separate elements, they may be part of a single machine, which includes a microprocessor (or other type of controller) and a memory. Alternatively, the processor 42 may rely on memory 43 for all of its memory needs.

The processor 42 and memory 43 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The above discussion regarding the at least one processor 42 and the at least one memory 43 may be applied to other devices, such as to computing functionality resident on the agricultural baler 2.

In one or some embodiments, the agricultural production machine 1 may include an input/output unit 44. In one or some embodiments, the input/output unit 44 may comprise a touchscreen in which an operator may enter data or other types of input (e.g., one or more pressure values (e.g., pressure relief valve values or pressure valve settings) to control one or more valves, such as any one, any combination, or all of: the valve 23 in the lubricant inlet 22 of the piston/cylinder unit 13; the valve 26 in the lubricant outlet 25 of the piston/cylinder unit 13; or the valve 39 in the branch line 36, discussed further below). Alternatively, or in addition, the one or more pressure values to control one or more valves may be preset and stored in memory 43, as discussed further below. In turn, the control unit 41, using the one or more pressure values to control one or more valves, may control the valves as discussed herein. For example, the control unit 41 may send one or more commands (e.g., transmit the one or more commands wired and/or wirelessly) to a receiver on the agricultural baler 2 in order to control the one or more valves resident on the agricultural baler 2.

As one example, the control unit 41 may communicate with one or more devices resident on the agricultural production machine 1 (e.g., the input/output unit 44) and/or on the agricultural baler 2 (e.g., the valve(s)). The communication may be wired and/or wireless. In particular, the agricultural production machine 1 may include a transceiver 45 (e.g., transmitting and/or receiving data and/or commands). Further, the agricultural baler 2 may include a transceiver 46 (e.g., transmitting and/or receiving data and/or commands). In this regard, control unit 41 may be configured to communicate wired and/or wirelessly with one or more other electronic devices as described herein.

Figure 2:
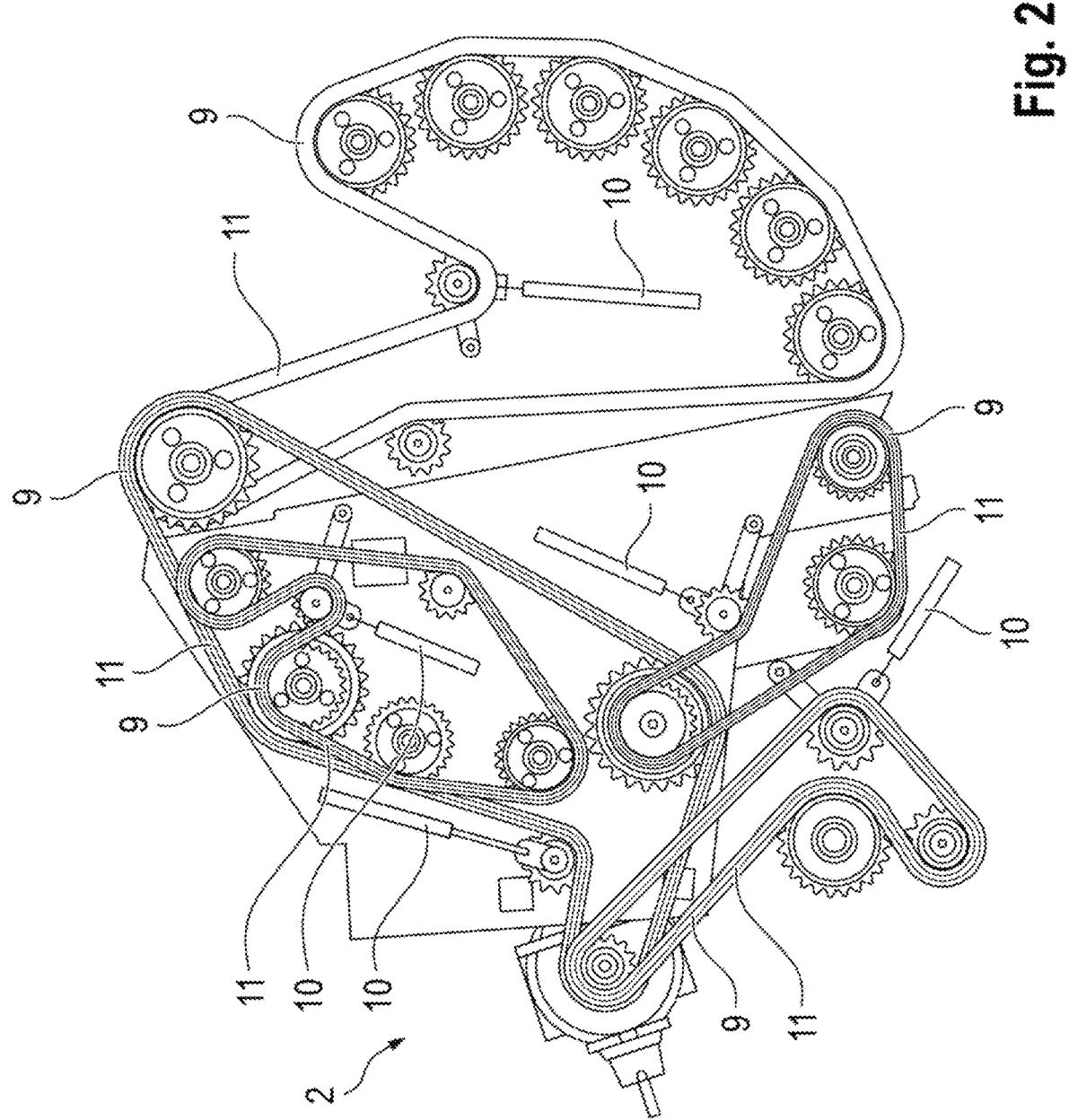
FIG. 2 illustrates a schematic and exemplary representation of the agricultural baler without a chassis and cladding.

The representation depicted in FIG. 2 shows schematically and exemplarily agricultural baler 2 with at least one traction drive 9 for driving working units of the agricultural baler 2. In the representation depicted in FIG. 2, not only one such traction drive 9 is shown, but rather a plurality of such traction drives 9, each of which drives one or more working units of the agricultural baler 2. A traction drive 9 may optionally be designed as a belt drive or as a chain drive. In the case of a plurality of traction drives 9, it is possible for some of the traction drives 9 of the plurality of traction drives 9 to be designed as belt drives, and other traction drives 9 of the plurality of traction drives 9 to be designed as chain drives. It is also possible for all traction drives 9 of the plurality of traction drives 9 to be designed as belt drives, or for all of the traction drives 9 of the plurality of traction drives 9 to be designed as chain drives. Each traction drive 9 may comprise at least one drive wheel for supplying driving force to the traction drive 9, and at least one driven wheel for delivering the driving force to a working unit. The drive wheel of one traction drive 9 may interact with a driven wheel of another traction drive 9.

In one or some embodiments, one, some or each of these traction drives 9 may be assigned at least one tensioning device 10, which is arranged or positioned on or fastened to the agricultural baler 2, such as to a supporting frame structure of the agricultural baler 2, for example a supporting frame structure of the fixed housing part 3 and/or the discharge flap 4. Using the tensioning device 10, a tensioning force may be applied to a traction means 11 of the traction drive 9 so that the required driving force is transmitted from the traction drive 9 to the working units of the agricultural baler 2 to be driven. In one or some embodiments, structure for the traction means may comprise either a belt or a chain. 11 For the tensioning force applied by the tensioning device 10 to the traction means 11 to be adjustable, the tensioning device 10 may comprise a tensioning member 12 whose design and operation are explained in detail below with reference to FIGS. 3-5.

Figure 3:
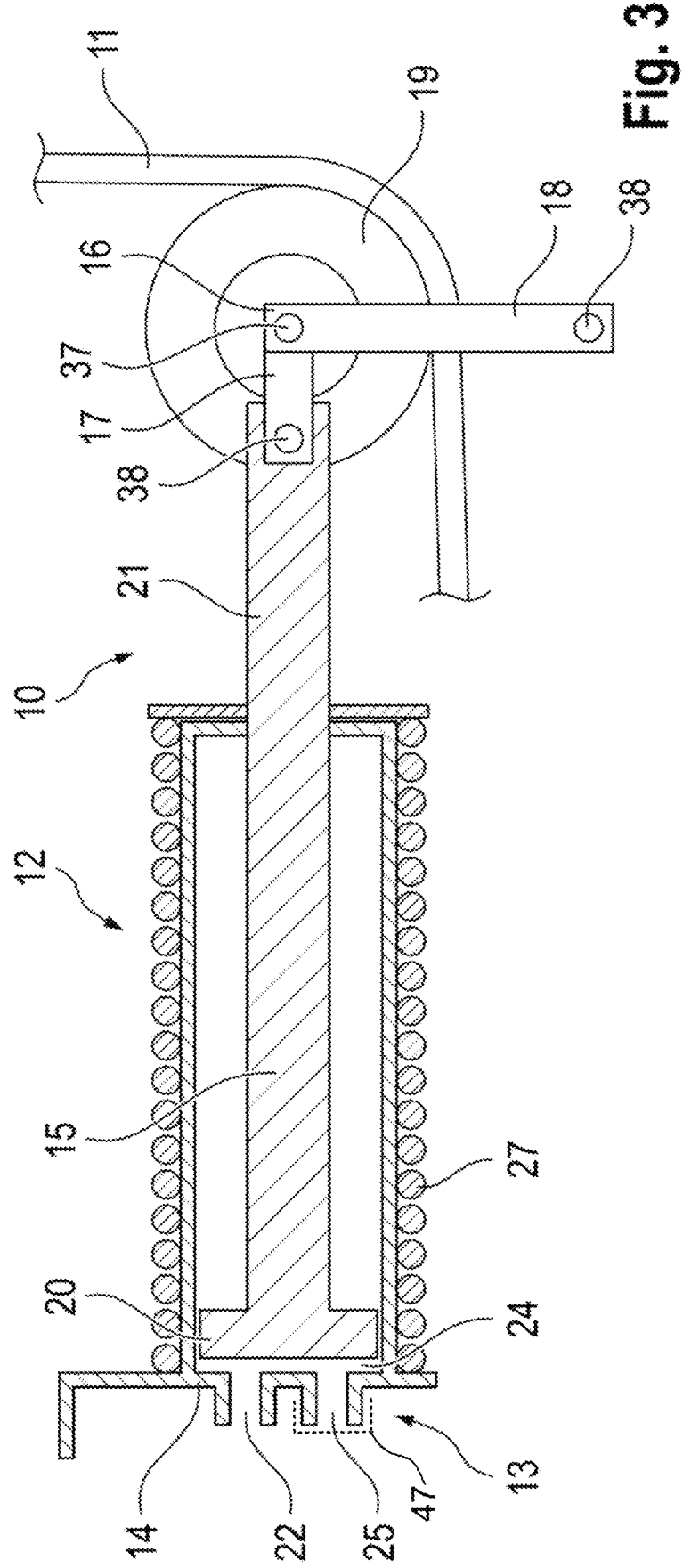
FIG. 3 illustrates a schematic and exemplary representation of a tensioning device.

In one or some embodiments, the tensioning device 10, which is shown schematically and in detail by way of example in FIG. 3, includes the tensioning member 12 that comprises a piston/cylinder unit 13 to which a lubricant may be supplied for adjusting a tensioning force exerted on the traction means 11 of the traction drive 9.

In one or some embodiments, the piston/cylinder unit 13 comprises a cylinder 14 and a piston 15 movably arranged or positioned in the cylinder 14. The piston 15 may be connected directly or indirectly via an additional lever 16, such as a lever 16 comprising two lever arms 17, 18, to a tensioning means 19 of the tensioning device 10, via which the tensioning force may be applied to the traction means 11 of the traction drive 9. The tensioning device 10 may be arranged, positioned on, or attached to the agricultural baler 2 via the cylinder 14. The piston 15 may comprise a piston head 20 and a piston rod 21 adjoining the piston head 20. Depending on the design of the traction drive 9 either as a belt drive or else as a chain drive, in one or some embodiments, the tensioning means 19 may be correspondingly designed as a belt tensioning wheel (or belt tensioning pulley) or as a chain tensioning wheel (e.g., depending on whether the traction means 11 is designed as either a belt or a chain). As previously indicated, the tensioning force may be applied or adjusted in such a way that a lubricant is supplied to the piston/cylinder unit 13. The lubricant, which may also be used to lubricate lubrication points of the agricultural baler 2, may be a lubricating grease.

Figure 4:
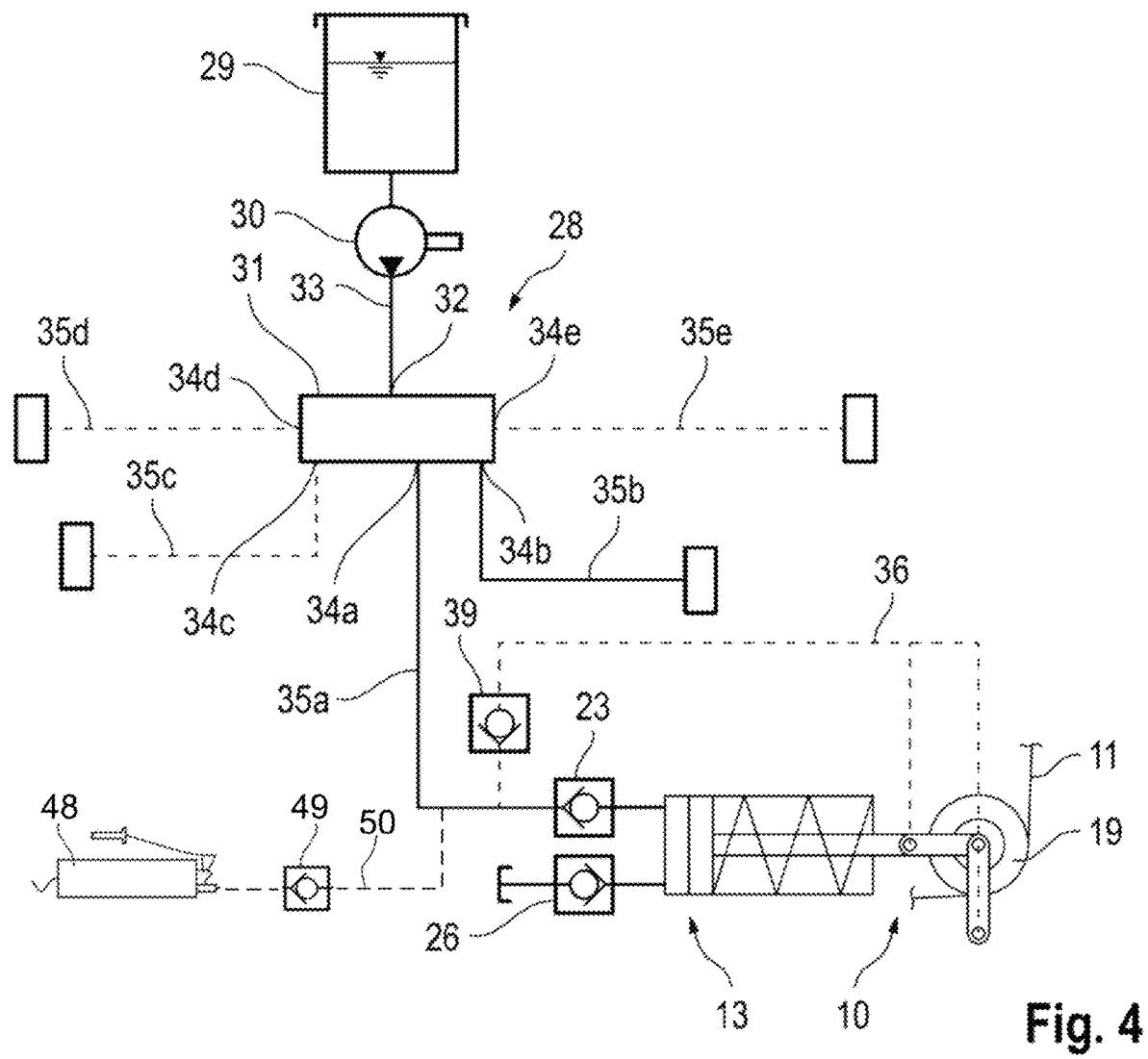
FIG. 4 illustrates a schematic and exemplary circuit diagram for feeding lubricant into a piston/cylinder unit of the tensioning device using a central lubrication system of the agricultural baler according to the invention.
Figure 5:
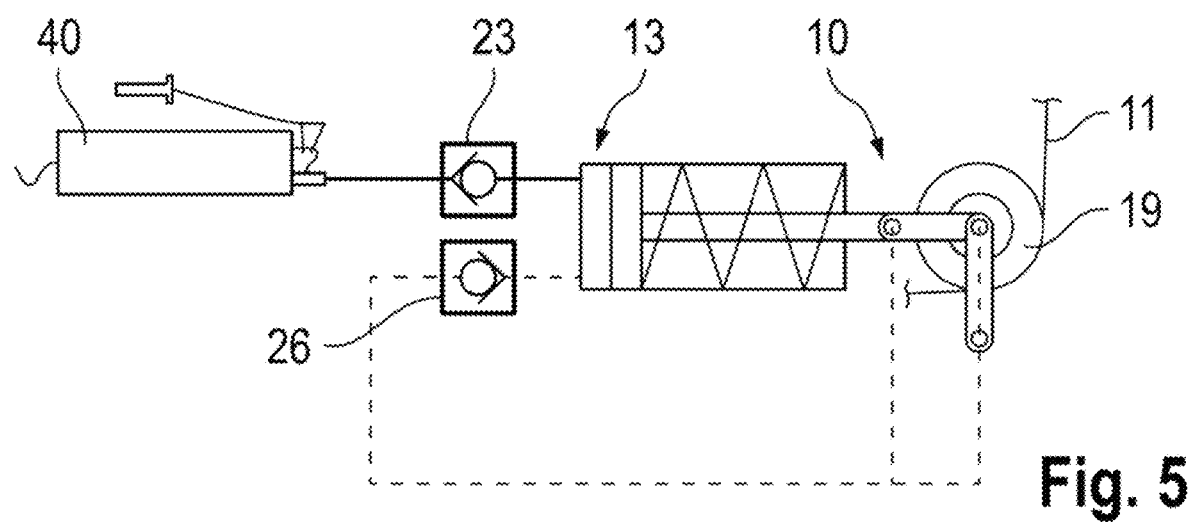
FIG. 5 illustrates a schematic and exemplary circuit diagram for feeding lubricant into the piston/cylinder unit of the tensioning device using a grease gun.

To enable the lubricant to be supplied to the piston/cylinder unit 13 for adjusting the tensioning force applied to the traction means 11 of the traction drive 9 using the tensioning device 10, the piston/cylinder unit 13 may include a lubricant inlet 22 that is formed on the cylinder 14 of the piston/cylinder unit 13. The lubricant inlet 22 may include a check valve 23 that is shown in FIGS. 4 and 5, so that the lubricant may flow into the cylinder 14 into a cylinder chamber 24 that is formed by an inner wall of the cylinder 14 and an end surface of the piston 15, but the lubricant is prevented from flowing out of the cylinder chamber 24. In one or some embodiments, the check valve 23 in the lubricant inlet 22 may be designed to be controllable so that an opening pressure for the check valve 23 may be flexibly adjusted. For example, control unit 41 may be configured to send a command (wired and/or wirelessly) to check valve 23 in order to open and/or close, as discussed herein (e.g., based on operator-input pressure values and/or by presettable pressure values).

The piston/cylinder unit 13 may also include a lubricant outlet 25 that is also formed in the cylinder 14 of the piston/cylinder unit 13. The lubricant outlet 25 may include at least one valve 26, such as a check valve or a pressure relief valve, shown in FIG. 5, such that a portion of the lubricant supplied to the cylinder 14 may flow out of the cylinder chamber 24 to adjust the tensioning force when a presettable or preset pressure value is exceeded. In one or some embodiments, the valve 26, such as a check valve or a pressure relief valve, in the lubricant outlet 25 may be controllable or adjustable so that an opening pressure for the valve 26, such as a check valve or a pressure relief valve, is flexibly adjustable. For example, control unit 41 may be configured to send a command (wired and/or wirelessly) to valve 26 in order to open and/or close, as discussed herein (e.g., based on operator-input pressure values and/or by presettable pressure values). The lubricant outlet 25 may also be closed with a closure 47.

The tensioning member 12 of the tensioning device 10 may also comprise a tensioning spring 27 which is arranged or positioned between the cylinder 14 and the piston 15 of the piston/cylinder unit 13. In one or some embodiments, the tensioning spring 27 is arranged or positioned such that one end thereof is supported on a portion of the cylinder 14, and the opposite other end thereof is connected to the piston 15. As the lubricant is supplied to the piston/cylinder unit 13 and the piston 15 therefore moves in the cylinder 14, the tensioning spring 27 may be pretensioned, wherein the tensioning force may be applied to the traction means 11 of the traction drive 9 by the direct or indirect coupling of the piston 15 to the tensioning means 19.

The supply of lubricant to the piston/cylinder unit 13 for adjusting the tension force exerted on the traction means 11 may be accomplished in various ways. According to an embodiment illustrated in FIG. 4, the agricultural baler 2 comprises a so-called central lubrication system 28 which may primarily serve to supply lubricant, such as lubricating grease, to lubrication points of the agricultural baler 2. This central lubrication system 28 may also serve to supply the piston/cylinder unit 13 with lubricant for adjusting the tensioning force exerted on the traction means 11. For this purpose, the central lubrication system 28 may be fluidically connected to the lubricant inlet 22 of the piston/cylinder unit 13 for supplying the lubricant.

In one or some embodiments, the central lubrication system 28 may comprise any one, any combination, or all of at least one lubricant container 29, a lubricant pump 30 and a lubricant distribution unit 31. The lubricant pump 30 may be fluidically connected both to the lubricant container 29 (or lubricant reservoir) and to the lubricant distribution unit 31 and conveys the lubricant, such as the lubricating grease, from the lubricant container 29 to the lubricant distribution unit 31. For this purpose, the lubricant distribution unit 31 may comprise a lubricant inlet 32, which may be fluidically connected to the lubricant pump 30 using a lubricant main line 33. The lubricant distribution unit 31 may also comprise at least two lubricant outlets 34a-34n. One lubricant outlet 34a of the at least two lubricant outlets 34a-n may be fluidically connected to the lubricant inlet 22 of the piston/cylinder unit 13 via a lubricant distribution line 35a. At least one additional lubricant outlet 34b of the at least two lubricant outlets 34a-n of the lubricant distribution unit 31 may be fluidically connected to a lubrication point of the agricultural baler 2 using an additional lubricant distribution line 35b. In one or some embodiments, the lubricant distribution unit 31 may comprise not just one additional lubricant outlet 34*b*, but rather a plurality of additional lubricant outlets 34*b-n* that are each fluidly connected to a corresponding lubrication point of the agricultural baler 2 using a further lubricant distribution line 35*b-n*. The additional lubricant distribution lines 35*b-n* may also be fluidically connected to additional lubricant distribution units (not shown in the figures) from which, in turn, a plurality of lubricant distribution lines may depart, which may lead to lubrication points of the agricultural baler 2.

Accordingly, the central lubrication system 28, used for lubricating the lubrication points of the agricultural baler 2, may also be used to adjust the tensioning force of the tensioning device 10. For this purpose, the lubricant, such as the lubricating grease, may be supplied to the piston/cylinder unit 13 via the central lubricating system 28, and this may be done at a pressure such that a desired or necessary tensioning force may be applied to the traction means 11 of the traction drive 9. An operator therefore does not have to manually adjust the tensioning device 10. Instead, the adjustment of the tensioning force of the tensioning device 10 may occur automatically, namely as soon as the agricultural baler 2 is put into operation. In one or some embodiments, the control unit 41 may determine when the agricultural baler 2 is put into operation. Responsive thereto, the control unit may automatically control the adjustment of the tensioning force of the tensioning device 10.

In one or some embodiments, the lubricant distribution line 35*a* connecting the lubricant outlet 34*a* of the lubricant distribution unit 31 to the lubricant inlet 22 of the piston/cylinder unit 13 may comprise a branch line 36 which branches off from the lubricant distribution line 35*a*, such as directly upstream from the lubricant inlet 22 of the piston/cylinder unit 13. The branch line 36 may be fluidically connected to at least one lubrication point on the tensioning device. In one or some embodiments, the branch line 36 is fluidically connected to a bearing point 37 of the tensioning means 19 and/or at least one bearing point 38 of the additional lever 16, if one is used. Furthermore, the branch line 36 may include at least one valve 39, such as a check valve or a pressure relief valve. This valve 39, such as check valve or pressure relief valve, may also be a controllable or adjustable valve. For example, control unit 41 may be configured to send a command (wired and/or wirelessly) to valve 39 in order to open and/or close, as discussed herein (e.g., based on operator-input pressure values and/or by presettable pressure values).

If the pressure in the lubricant distribution line 35*a* accordingly exceeds the pressure required to apply the tensioning force, the valve 39, such as the check valve or the pressure relief valve, may be released so that the lubricating points of the tensioning device 10 may be supplied with lubricant, such as lubricating grease, via the branch line 36. In such an embodiment, the lubricant outlet 25 may be closed with the closure so that no lubricant may escape from the cylinder chamber 24 of the piston/cylinder unit 13 via the closure, but only via the branch line 36 to the lubrication points of the tensioning device 10. Alternatively, a pressure which may be set for releasing the valve 26, such as a check valve or a pressure relief valve, may be selected to be higher than the pressure which is necessary for releasing the check valve 39 or pressure relief valve 39 so that when the pressure necessary for setting the tensioning force is reached, the lubricant is always supplied to the lubrication points of the tensioning device 10 via the branch line 36. As discussed above, the setting of the pressure value(s) for the respective valve(s) may be selected in one of several ways, such as via input/output unit 44 and/or via being preset.

According to an additional embodiment illustrated in FIG. 5, the lubricant inlet 22 of the piston/cylinder unit 13 for supplying the lubricant, such as lubricating grease, may be designed as a lubricating nipple. Unlike in the embodiment described above, the lubricant, such as the lubricating grease, may accordingly not be supplied to the piston/cylinder unit 13 via a central lubricating system 28, but rather may be introduced into the cylinder chamber 24 of the piston/cylinder unit 13 via a grease gun 40 placed on the lubricating nipple, whereby the tensioning device 10 applies the tensioning force to the traction means 11 of the traction drive 9.

In such an embodiment, the lubricant outlet 25 of the piston/cylinder unit 13 may not be closed with a closure, so that when the necessary pressure for setting the tensioning force is reached, excess lubricant may escape via the lubricant outlet 25 of the piston/cylinder unit 13, which may be equipped with the valve 26, such as the check valve or pressure relief valve. In one or some embodiments, the lubricant outlet 25 may be fluidically connected to at least one lubrication point on the tensioning device 10, such as the bearing point of the tensioning means 19 and/or at least one bearing point of the additional lever 16, so that the excess lubricant may be used to lubricate these points.

With the embodiment described above and shown in FIG. 4 having a central lubrication system 28, it is furthermore possible to also implement an optional manual supply via a grease gun 48. For this purpose, an additional inlet or an additional branch line 50 may be provided at the lubricant distribution line 35*a*, such as with a check valve or pressure relief valve 49, to which the grease gun 48 may be connected in order to supply lubricant for adjusting the tensioning force to the cylinder chamber 24.

In one or some embodiments, the agricultural baler 2 may also comprise a control unit 41, as discussed above. The control unit 41 may be configured to selectively control any one, any combination, or all of the check valve 23 in the lubricant inlet 22 of the piston/cylinder unit 13, the valve 26 in the lubricant outlet 25 of the piston/cylinder unit 13, the valve 39 in the branch line 36 branching off from the lubricant distribution line 35*a* and/or the lubricant container 29, the lubricant pump 30 and/or the lubricant distribution unit 31 of the central lubrication system 28 in accordance with a presettable or preset specification. The specifications may be set by the operator via an operating device (such as an input/output unit 44) formed on the agricultural baler 2 or the agricultural production machine 1 that pulls or tows the agricultural baler 2, which is connected to the control device for transmitting data, and/or may be stored in a memory unit connected to the control device for transmitting data. One example of the operating device comprises control unit 41, as discussed above. Further, one example of the input/output unit 44 comprises a touchscreen, as discussed above. If the valves 23, 26, 39 are not designed as adjustable or controllable valves (e.g., controllable via operator input via the input/output unit 44), they may nevertheless be preset before the agricultural baler 2 is started up in such a way that the necessary tensioning force may be set via a supply of lubricant, such as lubricating grease, in accordance with the embodiments described above.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural work machine
2 Agricultural baler
3 Fixed housing part
4 Discharge flap
5 Chassis
6 Baling chamber
7 Means for picking up and conveying harvested material
8 Pressing roller
9 Traction means drive
10 Clamping apparatus
11 Traction means
12 Tensioning member
13 Piston/cylinder unit
14 Cylinder
15 Piston
16 Lever
17 Lever arm
18 Lever arm
19 Tensioning means
20 Piston head
21 Piston rod
22 Lubricant inlet
23 Check valve/pressure relief valve
24 Cylinder chamber
25 Lubricant outlet
26 Check valve/pressure relief valve
27 Tensioning spring
28 Central lubrication system
29 Lubricant container
30 Lubricant pump
31 Lubricant distribution unit
32 Lubricant inlet
33 Lubricant main line
34a-n Lubricant outlet
35a-n Lubricant distribution line
36 Branch line
37 Bearing point
38 Bearing point
39 Check valve/pressure relief valve
40 Grease gun
41 Control unit
42 Processor
43 Memory
44 Input/output unit
45 Communication functionality
46 Communication functionality
47 Closure
48 Grease gun
49 Check valve/pressure relief valve
50 Additional branch line

The invention claimed is:
1. An agricultural baler comprising:
at least one traction drive configured to drive one or more working units of an agricultural baler;
at least one tensioning device is assigned to the at least one traction drive, the at least one tensioning device comprising a tensioning member configured to adjust a tensioning force exerted by the at least one tensioning device on a traction means of the at least one traction drive; and
a control unit;
wherein the at least one tensioning member comprises a piston/cylinder unit that includes a lubricant inlet configured to supply lubricant, wherein a piston of the piston/cylinder unit is connected directly or indirectly via an additional lever to a tensioning means of the tensioning device, via which the tensioning force is applied to the traction means of the at least one traction drive; and
wherein the control unit is configured to control the lubricant inlet to supply the lubricant to the piston/cylinder unit for adjusting the tensioning force exerted on the traction means.
2. The agricultural baler of claim 1,
wherein the lubricant inlet comprises a controllable check valve; and
wherein the control unit is configured to control the controllable check valve.
3. The agricultural baler of claim 2, further comprising an input/output unit configured to input a pressure valve setting; and
wherein the control unit is configured to control the controllable check valve dependent on the pressure valve setting.
4. The agricultural baler of claim 1, wherein the agricultural baler comprises a central lubrication system which is fluidly connected to the lubricant inlet of the piston/cylinder unit for supplying the lubricant.
5. The agricultural baler of claim 4, wherein the central lubrication system comprises at least one lubricant container, a lubricant pump and a lubricant distribution unit;
wherein the lubricant pump is fluidically connected both to the lubricant container and to the lubricant distribution unit;
wherein the lubricant distribution unit comprises a lubricant inlet which is fluidically connected to the lubricant pump using a lubricant main line and at least two lubricant outlets; and
wherein one lubricant outlet of the at least two lubricant outlets is fluidically connected to the lubricant inlet of the piston/cylinder unit via a lubricant distribution line.
6. The agricultural baler of claim 5, wherein the lubricant distribution line connecting at least one of the at least two lubricant outlets of the lubricant distribution unit to the lubricant inlet of the piston/cylinder unit comprises a branch line which branches off from the lubricant distribution line;
wherein the branch line is fluidically connected to at least one lubrication point on the tensioning device; and
wherein the branch line comprises a controllable or adjustable valve under control of a control unit.
7. The agricultural baler of claim 6, wherein the lubricant distribution line is upstream from the lubricant inlet of the piston/cylinder unit;
wherein the at least one lubrication point on the tensioning device is one or both of a bearing point of the tensioning means or at least one bearing point of the additional lever; and
wherein the control unit is configured to access a pressure relief valve value in order to control the controllable or adjustable valve.

8. The agricultural baler of claim 7, wherein at least one additional lubricant outlet of the at least two lubricant outlets of the lubricant distribution unit is fluidically connected to a lubrication point of the agricultural baler using an additional lubricant distribution line.

9. The agricultural baler of claim 1, wherein the lubricant inlet of the piston/cylinder unit configured to supply the lubricant is designed as a grease nipple; and
wherein the lubricant supplied to the piston/cylinder unit via the grease nipple is via a grease gun.

10. The agricultural baler of claim 1, wherein the piston/cylinder unit comprises a lubricant outlet configured to discharge at least a portion of the lubricant from the piston/cylinder unit.

11. The agricultural baler of claim 10, wherein the lubricant outlet comprises a controllable or adjustable valve; and
further comprising a control unit configured to control the controllable or adjustable valve.

12. The agricultural baler of claim 1, further comprising a control unit configured to perform one or more of:
selectively control at least one valve in the lubricant inlet of the piston/cylinder unit;
selectively control at least one valve in a lubricant outlet of the piston/cylinder unit; and
selectively control at least one valve in a branch line branching off from one or more of a lubricant distribution line, a lubricant container, a lubricant pump, or a lubricant distribution unit of a central lubrication system.

13. The agricultural baler of claim 12, further comprising an input/output unit configured to receive at least one pressure value; and
wherein the control unit is configured to selectively control one or more of the at least one valve in the lubricant inlet, the at least one valve in the lubricant outlet, or the at least one valve in the branch line based on the at least one pressure value.

14. The agricultural baler of claim 1, wherein the tensioning member comprises a tensioning spring positioned between a cylinder and the piston of the piston/cylinder unit.

15. The agricultural baler of claim 1, wherein the agricultural baler comprises a plurality of traction drives each having at least one tensioning device.

16. The agricultural baler of claim 1, wherein the at least one traction drive comprises a belt drive; and
wherein the tensioning means of the tensioning device comprises a belt tensioning pulley.

17. The agricultural baler of claim 1, wherein the at least one traction drive comprises a chain drive; and
wherein the tensioning means of the tensioning device comprises a chain tensioning wheel.

18. An agricultural baler, comprising:
at least one traction drive configured to drive one or more working units of an agricultural baler; and
at least one tensioning device is assigned to the at least one traction drive, the at least one tensioning device comprising a tensioning member configured to adjust a tensioning force exerted by the at least one tensioning device on a traction means of the at least one traction drive;
wherein the at least one tensioning member comprises a piston/cylinder unit, wherein a piston of the piston/cylinder unit is connected directly or indirectly via an additional lever to a tensioning means of the tensioning device, via which the tensioning force is applied to the traction means of the at least one traction drive;
wherein a lubricant is supplied to the piston/cylinder unit for adjusting the tensioning force exerted on the traction means;
wherein the piston/cylinder unit comprises a lubricant outlet configured to discharge at least a portion of the lubricant from the piston/cylinder unit;
wherein the lubricant outlet of the piston/cylinder unit is fluidically connected to at least one lubrication point on the tensioning device; and
wherein the at least one lubrication point on the tensioning device comprises one or both of a bearing point of the tensioning means or at least one bearing point of the additional lever.

19. An agricultural machine and baler combination comprising:
an agricultural production machine; and
an agricultural baler configured for being pulled by the agricultural production machine;
wherein the agricultural baler comprises:
at least one traction drive configured to drive one or more working units of an agricultural baler;
at least one tensioning device is assigned to the at least one traction drive, the at least one tensioning device comprising a tensioning member configured to adjust a tensioning force exerted by the at least one tensioning device on a traction means of the at least one traction drive; and
a control unit:
wherein the at least one tensioning member comprises a piston/cylinder unit that includes a lubricant inlet configured to supply lubricant, wherein a piston of the piston/cylinder unit is connected directly or indirectly via an additional lever to a tensioning means of the tensioning device, via which the tensioning force is applied to the traction means of the at least one traction drive; and
wherein the control unit is configured to control the lubricant inlet to supply the lubricant to the piston/cylinder unit for adjusting the tensioning force exerted on the traction means.

* * * * *